US010989674B2

(12) United States Patent
Tatsumi et al.

(10) Patent No.: US 10,989,674 B2
(45) Date of Patent: Apr. 27, 2021

(54) X-RAY INSPECTION APPARATUS AND X-RAY INSPECTION METHOD

(71) Applicant: HITACHI HIGH-TECH SCIENCE CORPORATION, Tokyo (JP)

(72) Inventors: Masaki Tatsumi, Tokyo (JP); Isao Yagi, Tokyo (JP); Haruo Takahashi, Tokyo (JP)

(73) Assignee: HITACHI HIGH-TECH SCIENCE CORPORATION, Tokyo (JP)

( * ) Notice: Subject to any disclaimer, the term of this patent is extended or adjusted under 35 U.S.C. 154(b) by 0 days.

(21) Appl. No.: 16/730,901

(22) Filed: Dec. 30, 2019

(65) Prior Publication Data

US 2020/0284738 A1 Sep. 10, 2020

(30) Foreign Application Priority Data

Mar. 4, 2019 (JP) .............................. JP2019-038713

(51) Int. Cl.
*G01N 23/083* (2018.01)
*H04N 5/372* (2011.01)
*G01N 23/18* (2018.01)

(52) U.S. Cl.
CPC .......... *G01N 23/083* (2013.01); *G01N 23/18* (2013.01); *H04N 5/37206* (2013.01); *G01N 2223/401* (2013.01)

(58) Field of Classification Search
None
See application file for complete search history.

(56) References Cited

U.S. PATENT DOCUMENTS

| 2004/0173754 | A1* | 9/2004 | Miyaguchi | H04N 5/37206 250/370.11 |
| 2017/0031054 | A1* | 2/2017 | Matoba | G01N 23/04 |
| 2018/0202947 | A1* | 7/2018 | Urano | G01N 23/10 |
| 2020/0128199 | A1* | 4/2020 | McCorkle | H04N 5/378 |
| 2021/0021780 | A1* | 1/2021 | Kim | H01L 27/14818 |

FOREIGN PATENT DOCUMENTS

| JP | 2013036805 A | 2/2013 |
| JP | 2018096796 A | 6/2018 |

* cited by examiner

*Primary Examiner* — Hoon K Song
(74) *Attorney, Agent, or Firm* — Holland & Hart LLP

(57) ABSTRACT

Provided are an X-ray inspection apparatus and an X-ray inspection method. The X-ray inspection apparatus includes: an X-ray source; a sample moving mechanism; the TDI sensor; and a TDI computing unit. The TDI computing unit includes a data transfer unit configured to transfer, to an outside, data of accumulated charges obtained by accumulating and transferring the charges, and has a function of setting in advance, as a determination region, a plurality of columns of line sensors with which the sample is detectable, and of detecting the sample in the determination region. The data transfer unit is configured to set, as detecting rows, rows of the pixels with which the sample has been detected in the determination region and rows around the rows, and transfer, to the outside, the data of accumulated charges only for pixels in the detecting rows.

5 Claims, 2 Drawing Sheets

X-RAY INSPECTION APPARATUS AND X-RAY INSPECTION METHOD

CROSS REFERENCE TO RELATED APPLICATION(S)

This application claims the benefit of Japanese Patent Application No. 2019-038713, filed Mar. 4, 2019, which is hereby incorporated by reference in its entirety into this application.

BACKGROUND OF THE INVENTION

1. Field of the Invention

The present invention relates to an X-ray inspection apparatus and an X-ray inspection method, with which a minute foreign substance or other substances in a sample are detectable.

2. Description of the Related Art

In general, in order to detect a foreign substance or other substances, such as minute metal, in a sample, there is used an X-ray transmission inspection, in which an inspection is performed with an X-ray transmission image acquired by irradiating the sample with an X-ray. For example, in recent years, in a lithium ion secondary battery adopted in a vehicle, a hybrid vehicle, or an electric vehicle, in an electrode to serve as a positive electrode, lithium manganese oxide films or lithium cobalt oxide films are formed on both sides of an aluminum film. Accordingly, when a foreign substance of several tens of μm or more, for example, Fe or SUS is included in the electrode, a short circuit may occur to burn the battery or reduce performance. Therefore, the inclusion of the foreign substance is detected and removed through the X-ray transmission inspection during manufacturing.

As an X-ray inspection apparatus configured to detect such a foreign substance in the sample, there is known an X-ray inspection apparatus in which an X-ray source and an X-ray detector, for example, a line sensor, are arranged to be opposed to each other across the sample, which is moved in one direction, in performing the inspection in-line.

For example, in Japanese Patent Application Laid-open Nos. 2013-36805 and 2018-96796, there is proposed a transmission X-ray analyzing apparatus or an X-ray inspection apparatus configured to detect even minute foreign substance at high sensitivity with the use of a time delay integration (TDI) sensor.

In those X-ray inspection apparatus, a movement speed of the sample and a charge transfer rate of the TDI sensor are synchronized with each other, and charges generated in pixels (image sensor) of the TDI sensor are sequentially transferred to adjacent pixels in a movement direction of the sample to be accumulated and integrated, to thereby obtain data of accumulated charges with a high S/N ratio as X-ray detection data.

In other words, in detecting the foreign substance in the sample by continuously subjecting a wide sheet-shaped sample, for example, to X-ray transmission imaging, there is used the TDI sensor in which a plurality of columns (plurality of stages) of line sensors are arranged in parallel in a scanning direction, the line sensors each including a plurality of pixels arrayed as detectors, and charges accumulated in pixels of one line sensor are transferred to the next adjacent line sensor. In the TDI sensor, charges accumulated in a line sensor in a first column (first stage) are transferred to a line sensor in a second column, and the line sensor in the second column adds charges accumulated therein by receiving light to the charges transferred from the line sensor in the first column, and transfers the result to a line sensor in a third column. In this manner, charges transferred from line sensors in previous columns (previous stages) are sequentially added in each line sensor, and accumulated charges transferred to a line sensor in a last column are output as the X-ray detection data. Therefore, in the TDI sensor, when the number of columns (number of stages) is T, charges that are T times those of a single line sensor are accumulated to result in contrast that is T times and reduced noise, with the result that measurement can be performed at high speed, and the S/N ratio is increased.

The following problem remains in the related art described above.

Specifically, in the related-art X-ray inspection apparatus, as an inspection speed becomes higher, or as an amount of information obtained by a high-performance detector (TDI sensor) becomes larger, an amount of output data of accumulated charges becomes larger, and an amount of data to be transferred to a control computer, for example, also becomes larger. In particular, when a width of the sample becomes larger, a width of the line sensors of the TDI sensor also becomes larger, and when a conveyance speed of the sample is increased, it is required to increase the number of columns (number of stages) of the line sensors of the TDI sensor, with the result that an amount of data required for the transfer is disadvantageously increased. Further, in order to increase resolution, when a size of a pixel (element) is reduced to increase the number of pixels (number of elements), or when sensitivity of each pixel (element) is increased to increase an amount of detection data, the amount of transferred data is disadvantageously increased as well.

When the amount of data to be transferred is increased as described above, a delay or missing occurs in signal processing on the enormous amount of data in the control computer, and there has been a disadvantage that real-time data transfer becomes difficult.

SUMMARY OF THE INVENTION

The present invention has been made in view of the above-mentioned problem, and therefore has an object to provide an X-ray inspection apparatus and an X-ray inspection method, with which an amount of data to be transferred from a TDI sensor is reduced to enable real-time data transfer while maintaining detection ability.

The present invention adopts the following configuration in order to solve the above-mentioned problem. Specifically, an X-ray inspection apparatus according to a first aspect of the present invention includes: an X-ray source configured to irradiate a sample with an X-ray; a sample moving mechanism configured to move the sample in a particular direction during the irradiation with the X-ray from the X-ray source; a TDI sensor, which is mounted on an opposite side of the X-ray source with respect to the sample, and includes a plurality of columns of line sensors in the particular direction, the line sensors each including a plurality of pixels arrayed in a direction orthogonal to the particular direction so that the pixels are arranged in matrix, the TDI sensor being configured to detect the X-ray that has been transmitted through the sample with the pixels; and a TDI computing unit configured to control accumulation and transfer of charges in a plurality of the pixels in the particular direction, the TDI computing unit including a data transfer unit configured to transfer, to an outside, data of accumulated charges obtained by accumulating and transferring the charges, and having a function of setting in advance, as a determination region, a plurality of columns of the line sensors with which the sample is detectable, and of detecting the sample in the determination region, the data transfer unit being configured to set, as detecting rows, rows of the pixels with which the sample has been detected in the determination region and rows around the rows, and transfer, to the outside, the data of accumulated charges only for pixels in the detecting rows.

In the X-ray inspection apparatus, the TDI computing unit has the function of setting in advance, as the determination region, the plurality of columns of the line sensors with which the sample is detectable, and of detecting the sample in the determination region. With the data transfer unit setting, as the detecting rows, the rows of the pixels with which the sample has been detected in the determination region and the rows around the rows, and transferring, to the outside, the data of accumulated charges only for the pixels in the detecting rows, an amount of the data of accumulated charges to be transferred to the outside, for example, a control computer, can be reduced. In other words, only the data of accumulated charges in the detecting rows is used as information required to detect the foreign substance, and data of accumulated charges in other rows (non-detecting rows) that is not required as an inspection result is screened without being transferred, to thereby reduce the amount of data and enable real-time data transfer to the outside.

Further, according to a second aspect of the present invention, in the X-ray inspection apparatus of the first aspect, the TDI computing unit is configured to set in advance, as the determination region, a plurality of columns of the line sensors of all columns of the line sensors with which the sample is detectable first along with the movement of the sample, and to accumulate and transfer the charges for pixels in a next adjacent column only with pixels in the detecting rows in a region formed of the line sensors in columns subsequent to the determination region.

In other words, in the X-ray inspection apparatus, the TDI computing unit is configured to accumulate and transfer the charges for the pixels in the next adjacent column only with the pixels in the detecting rows in the region formed of line sensors in the columns subsequent to the determination region, and to avoid accumulating and transferring charges for pixels in rows other than the detecting rows in the region formed of the line sensors in the columns subsequent to the determination region, with the result that the processing of accumulation and transfer of the charges in the TDI computing unit can be reduced, and that a load on an arithmetic circuit (field-programmable gate array: FPGA) and the like of the TDI computing unit can be reduced.

Further, according to a third aspect of the present invention, in the X-ray inspection apparatus of the first or second aspect, the TDI computing unit is configured to suitably set a number of columns of the line sensors in the determination region depending on a material of the sample.

In other words, in the X-ray inspection apparatus, the TDI computing unit is configured to suitably set the number of columns of the line sensors in the determination region depending on the material of the sample. Therefore, through suitably setting a range of the determination region depending on a base material of the sample, for example, accuracy of detecting the foreign substance in the determination region can be increased as appropriate depending on the material of the sample.

An X-ray inspection method according to a fourth aspect of the present invention includes: an X-ray irradiation step of irradiating, by an X-ray source, a sample with an X-ray; a sample moving step of continuously moving the sample in a particular direction during the irradiation with the X-ray from the X-ray source; an X-ray detection step of detecting, by a TDI sensor, which is mounted on an opposite side of the X-ray source with respect to the sample, and includes a plurality of columns of line sensors in the particular direction, the line sensors each including a plurality of pixels arrayed in a direction orthogonal to the particular direction so that the pixels are arranged in matrix, the X-ray that has been transmitted through the sample with the pixels; a TDI computing step of accumulating and transferring charges in a plurality of the pixels in the particular direction; and a data transfer step of transferring, to an outside, data of accumulated charges obtained by accumulating and transferring the charges in the TDI computing step, the TDI computing step including setting in advance, as a determination region, a plurality of columns of the line sensors with which the sample is detectable, and determining to detect the sample in the determination region, the data transfer step including setting, as detecting rows, rows of the pixels with which the sample has been detected in the determination region and rows around the rows, and transferring, to the outside, the data of accumulated charges only for pixels in the detecting rows.

Further, according to a fifth aspect of the present invention, in the X-ray inspection method of the fourth aspect, the TDI computing step includes setting in advance, as the determination region, a plurality of columns of the line sensors of all columns of the line sensors with which the sample is detectable first along with the movement of the sample, and accumulating and transferring the charges only with pixels in the detecting rows in a region formed of the line sensors in columns subsequent to the determination region.

According to at least one embodiment of the present invention, the following effects can be provided.

Specifically, according to the X-ray inspection apparatus and the X-ray inspection method of at least one embodiment of the present invention, the plurality of columns of the line sensors with which the sample is detectable are set in advance as the determination region, the rows of the pixels with which the sample has been detected in the determination region and the rows around the rows are set as the detecting rows, and the data of accumulated charges is transferred to the outside only for the pixels in the detecting rows, with the result that the amount of data of accumulated charges to be transferred to the outside, for example, the control computer, can be reduced.

Therefore, with the X-ray inspection apparatus and the X-ray inspection method according to at least one the embodiment of the present invention, even when X-rays enter the TDI sensor for a short period of time or in a large amount, the data can be transferred to the outside, for example, the control computer in real time, and a delay or missing of signal processing is eliminated.

DESCRIPTION OF THE EMBODIMENTS

Now, an X-ray inspection apparatus and an X-ray inspection method according to at least one embodiment of the present invention are described with reference to FIG. 1 to FIG. 4.

Figure 1:
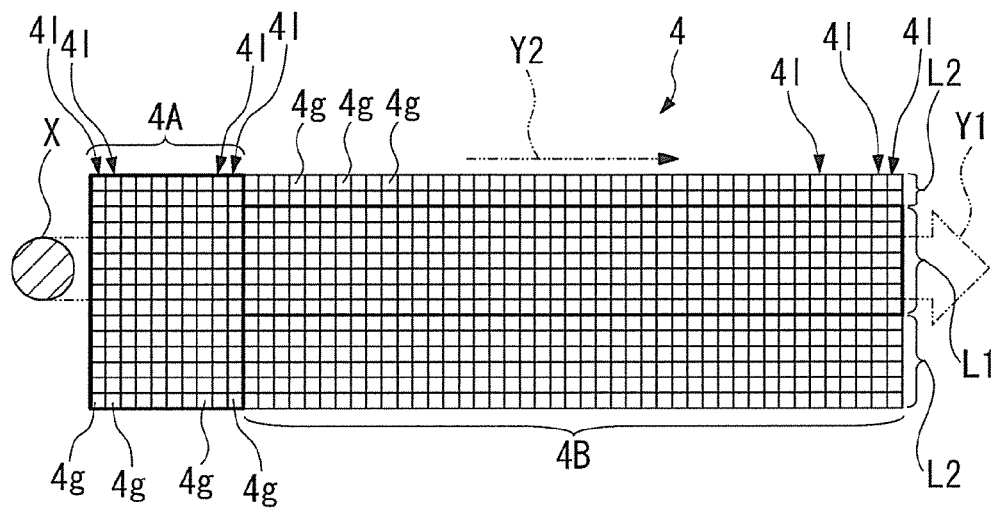
FIG. 1 is an explanatory diagram for illustrating a determination region in a TDI sensor in an X-ray inspection apparatus and an X-ray inspection method according to at least one embodiment of the present invention.
Figure 2:
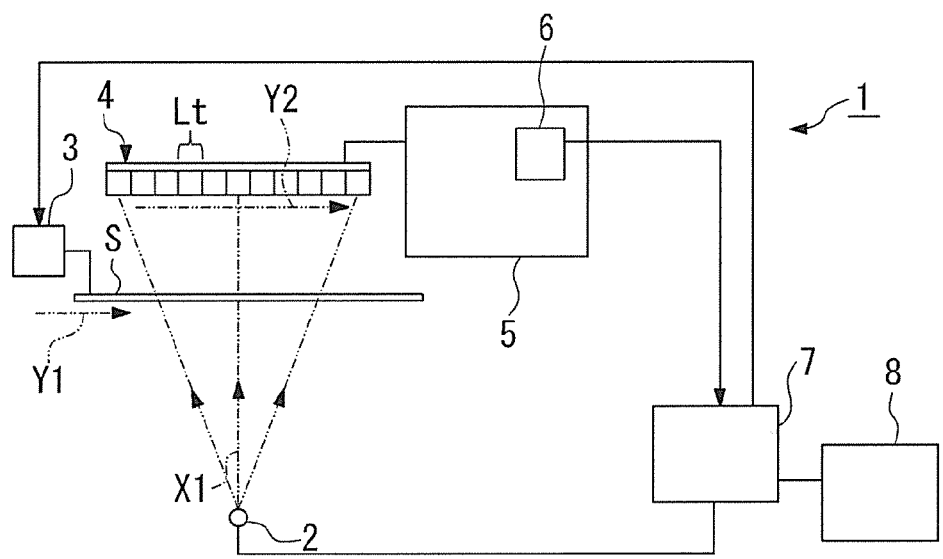
FIG. 2 is a schematic overall configuration diagram for illustrating the X-ray inspection apparatus according to at least one embodiment.
Figure 3:
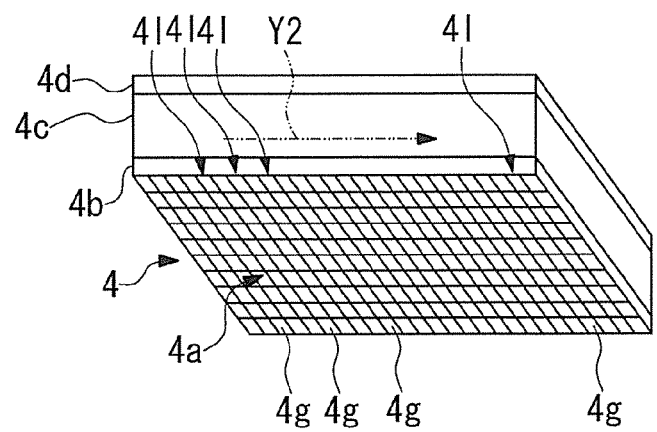
FIG. 3 is a perspective view for illustrating the TDI sensor in at least one embodiment.

The X-ray inspection apparatus according to at least one embodiment includes, as illustrated in FIG. 1 to FIG. 3: an X-ray source 2 configured to irradiate a sample S with an X-ray X1; a sample moving mechanism 3 configured to move the sample S in a particular direction Y1 during the irradiation with the X-ray X1 from the X-ray source 2; a time delay integration (TDI) sensor 4, which is mounted on an opposite side of the X-ray source 2 with respect to the sample S, and includes a plurality of columns of line sensors 4$l$ in the particular direction Y1, the line sensors 4$l$ each including a plurality of pixels 4$g$ arranged in a direction orthogonal to the particular direction Y1 so that the pixels 4$g$ are arranged in matrix, the TDI sensor 4 being configured to detect the X-ray X1 that has been transmitted through the sample S with the pixels 4$g$; and a TDI computing unit 5 configured to control accumulation and transfer of charges in a plurality of the pixels 4$g$ in the particular direction Y1.

The TDI computing unit 5 includes a data transfer unit 6 configured to transfer, to an outside, data of accumulated charges obtained by accumulating and transferring the charges.

The TDI computing unit 5 has a function of setting in advance, as a determination region 4A, a plurality of columns of the line sensors 4$l$ with which the sample S is detectable, and of detecting the sample S in the determination region 4A.

The above-mentioned data transfer unit 6 has a function of setting, as detecting rows L1, rows of the pixels 4$g$ with which the sample S has been detected in the determination region 4A and rows around the rows, and of transferring, to the outside, the data of accumulated charges only for pixels 4$g$ in the detecting rows L1.

The TDI computing unit 5 also has a function of setting in advance, as the determination region 4A, a plurality of columns of the line sensors 4$l$ with which the sample S is detectable first along with the movement of the sample S, and of accumulating and transferring the charges only with the pixels 4$g$ in the detecting rows L1 in a region 4B formed of the line sensors 4$l$ in columns subsequent to the determination region 4A. In other words, for non-detecting rows L2 other than the detecting rows L1 for a foreign substance X, the charges may not be integrated in pixels 4$g$ that are adjacent to each other in a row direction. A transfer direction (scanning direction Y2) of charges of the pixels 4$g$ in the TDI sensor 4 corresponds to a movement direction (particular direction Y1) of the sample S.

The above-mentioned region 4B is a region formed of a plurality of line sensors 4$l$ in columns (stages) subsequent to the determination region 4A, which is in previous columns (previous stages) in the scanning direction Y2.

In at least one embodiment, as illustrated in FIG. 1, the number of columns of line sensors 4$l$ in the determination region 4A is set to the number of columns that is ten percent of the total number of columns, for example, but the TDI computing unit 5 may suitably set the number of columns of line sensors 4$l$ in the determination region 4A depending on a material of the sample S.

In the case where a base material of the sample S is metal, for example, when the determination region 4A set to the same range as that applied when the base material is resin, it is hard for the foreign substance X to have clear contrast in a case of metal that hardly transmits the X-ray X1. Therefore, in the case of the metal as compared to the case of the resin, the range of the determination region 4A is set to be increased (the number of columns of line sensors 4$l$ in the determination region 4A is set to be large) so that sufficient contrast is obtained, with the result that accuracy of detecting the foreign substance in the determination region 4A can be increased.

An X-ray inspection apparatus 1 according to at least one embodiment further includes: an external main control unit 7 connected to each component to control the component; and a display unit 8 configured to display a transmission image indicating a distribution of intensities of the transmitted X-ray based on the transferred data.

The above-mentioned main control unit 7 is a control computer formed of a CPU, for example. The main control unit 7 includes an arithmetic processing circuit, for example, configured to perform image processing based on input signals (above-mentioned data) from the TDI sensor 4 to generate the transmission image, and further display the image on the display unit 8.

The above-mentioned display unit 8 is a display device connected to the main control unit 7 to display a contrast image, for example. The display unit 8 can display various kinds of information in response to the control by the main control unit 7.

The above-mentioned X-ray source 2 is an X-ray tube configured to radiate the X-ray X1, and is configured to emit from a window of beryllium foil, for example, as a primary X-ray, the X-ray X1 generated when thermal electrons generated from a filament (cathode) in the tube are accelerated by a voltage applied between the filament (cathode) and a target (anode) and collide with tungsten (W), molybdenum (Mo), or chromium (Cr) as the target.

The above-mentioned sample S is a material formed into a band shape and used for a lithium ion battery or drugs, for example. For example, when the sample S is an electrode sheet for use in a lithium ion secondary battery, for example, the foreign substance to be included therein is Fe or SUS, for example, which may be included as the foreign substance in the electrode.

The above-mentioned sample moving mechanism 3 is a motor, for example, which is movable in an extending direction of the sample S, for example, with respect to the TDI sensor 4. The above-mentioned sample moving mechanism 3 includes a pair of rollers (not shown) configured to move the band-shaped sample S in the extending direction by a roll-to-roll method, for example.

As the above-mentioned TDI sensor 4, a charge-coupled device (CCD) sensor, a complementary metal oxide semiconductor (CMOS) sensor, or a semiconductor sensor made of CdTe or Si, for example, is used. For example, as illustrated in FIG. 3, the above-mentioned TDI sensor 4 is an X-ray detector in which a plurality of pixels 4$g$ (cells, sensor elements) are arranged in each of directions perpendicular and parallel to the movement direction (particular direction Y1) of the sample S, and includes a phosphor 4$b$ arranged on a detection surface 4$a$, a fiber optics plate (FOP) 4$c$ in which a plurality of columns of optical fibers are arranged two-dimensionally, that is, vertically and horizontally under the phosphor 4b, and a Si light receiving element 4d arranged under the FOP 4c to have a configuration in which the plurality of columns (plurality of stages) of line sensors 4l are arranged. For example, 200 to 1,000 columns (stages) of unit line sensors 4l are arranged in a feed direction of the sample S to form the TDI sensor 4.

In the TDI sensor 4, the phosphors 4b made of, for example, cesium iodide (CsI), gadolinium oxysulfide (GOS), or yttrium aluminum garnet (YAG) are used.

In the TDI sensor 4, charge accumulation and charge transfer are performed at a pitch (sensor pitch) Lt of the pixels 4g arranged in the particular direction Y1.

Next, an X-ray inspection method using the X-ray inspection apparatus 1 according to at least one embodiment is described.

The X-ray inspection method according to the at least one embodiment includes: an X-ray irradiation step of irradiating, by the X-ray source 2, the sample S with the X-ray X1; a sample moving step of continuously moving the sample in the particular direction Y1 during the irradiation with the X-ray X1 from the X-ray source 2; an X-ray detection step of detecting, by the TDI sensor 4, which is mounted on the opposite side of the X-ray source 2 with respect to the sample S, and includes the plurality of columns of line sensors 4l in the particular direction Y1, the line sensors 4l each including a plurality of pixels 4g arrayed in the direction orthogonal to the particular direction Y1 so that the pixels 4g are arranged in matrix, the X-ray X1 that has been transmitted through the sample S with the pixels 4g; a TDI computing step of accumulating and transferring charges in a plurality of pixels 4g in the particular direction Y1; and a data transfer step of transferring, to the outside, the data of accumulated charges obtained by accumulating and transferring the charges in the TDI computing step.

In the above-mentioned TDI computing step, the TDI computing unit 5 sets in advance, as the determination region 4A, a plurality of columns of the line sensors 4l with which the sample S is detectable first along with the movement of the sample S, and determines to detect the sample S only in the determination region 4A.

Further, in the data transfer step, the data transfer unit 6 sets, as the detecting rows L1, the rows of the pixels 4g with which the sample S has been detected in the determination region 4A and the rows around the rows, and transfers, to the outside, the data of accumulated charges only for pixels 4g in the detecting rows L1.

In the above-mentioned X-ray inspection method according to at least one embodiment, the sample S is first moved between the X-ray source 2 and the TDI sensor 4, which are opposed to each other, in the particular direction Y1 at a constant speed by the sample moving mechanism 3. The sample S has a very small thickness as compared to a distance between the sample S and the TDI sensor 4.

Next, the sample S is irradiated with the X-ray X1 from the X-ray source 2, and the transmitted X-ray that has been transmitted through the sample S and the foreign substance is detected by the TDI sensor 4.

At this time, the sample S is moved in the particular direction Y1 by the sample moving mechanism 3, but when the sample S includes the foreign substance X, the TDI computing unit 5 first detects the foreign substance X based on the intensity distribution of the transmitted X-ray in the determination region 4A, and identifies rows of pixels 4g with which the foreign substance X has been detected.

The X-ray X1 transmitted through the same moving foreign substance X passes through and irradiates the pixels 4g in the same rows in the particular direction Y1. Therefore, information required for the inspection of the foreign substance is information of the pixels 4g in the detecting rows L1, which are formed of the rows of pixels 4g with which the foreign substance X has been detected and some rows around the rows, and the pixels 4g in the non-detecting rows L2, which are rows other than the detecting rows L1, are determined not to include the foreign substance X in the determination region 4A, with the result that information thereof is not required.

Therefore, the TDI computing unit 5 determines whether the foreign substance X is included in the determination region 4A, and accumulates and transfers charges in the plurality of pixels 4g in the particular direction Y1 for the detecting rows L1 for the foreign substance X. Accordingly, the data transfer unit 6 transfers, to the external main control unit 7, only data of accumulated charges obtained by accumulating and transferring the charges in the detecting rows L1 for the foreign substance X.

The TDI computing unit 5 can detect that the foreign substance X is included because a part including the foreign substance X in the determination region 4A has a different transmission amount of the X-ray X1 as compared to a part not including the foreign substance X, and hence because the part including the foreign substance X has different contrast from other parts.

Figure 4:
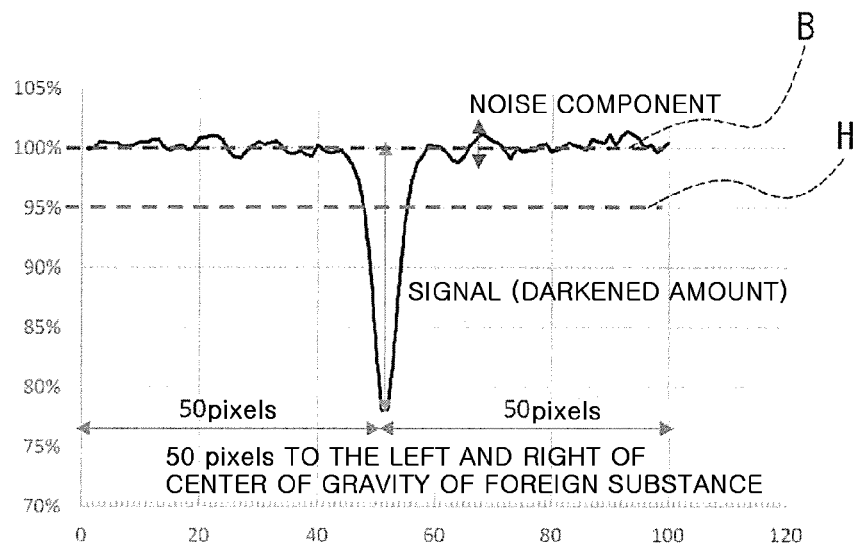
FIG. 4 is an explanatory graph for showing detection of a foreign substance in the determination region and setting of detecting rows in at least one embodiment.

For example, as shown in FIG. 4, when the intensity distribution of the transmitted X-ray X1 based on the data of accumulated charges in the determination region 4A is obtained, the data transfer unit 6 of the TDI computing unit 5 sets a baseline B mainly containing noise components to an intensity of 100%, and sets a determination line H on the presence or absence of the foreign substance X to an intensity of 95%. When an intensity is lower than the determination line H, it is determined that the foreign substance X is included, and rows of pixels 4g having the intensities of less than 95% and rows around the rows, that is, rows of 50 pixels on both sides of the center of the rows of pixels 4g with which the foreign substance X has been detected are set to the detecting rows L1. In this manner, some rows including the rows in which the foreign substance X has been detected, that is, the rows in which the foreign substance X has been detected and a plurality of rows around (on both sides of) the rows are set to the detecting rows L1.

The determination line H may be any value of intensity that is sufficiently lower than the baseline B, and is determined depending on a size of the foreign substance X to be detected, for example. For example, as the foreign substance X as the target becomes larger, the numerical value is set smaller. Further, the baseline B is determined based on luminance values of the pixels 4g imaged for the first several rows of the determination region 4A.

In the TDI computing step, in the region 4B formed of the line sensors 4l in columns subsequent to the determination region 4A, charges may be accumulated and transferred for pixels 4g in the next adjacent column only with the pixels 4g in the detecting rows L1. In other words, the non-detecting rows L2 for the foreign substance X may be set so that charges of the pixels 4g in the non-detecting rows L2 are not accumulated (integrated) or transferred because the charges are not transferred to the main control unit 7.

In the main control unit 7, the transferred data of accumulated charges of the detecting rows L1 is output and stored, and the intensity distribution of the transmitted X-ray is acquired based on the data of accumulated charges as required.

Further, the intensity distribution of the transmitted X-ray in the detecting rows L1 acquired as described above is subjected to the image processing in the main control unit 7 to generate the transmission image, and the transmission image is displayed on the display unit 8.

As described above, in the X-ray inspection apparatus 1 according to at least one embodiment, the TDI computing unit 5 has a function of setting in advance, as the determination region 4A, the plurality of columns of line sensors 4*l* with which the sample S is detectable, and of detecting the sample S in the determination region 4A, and the data transfer unit 6 sets, as the detecting rows L1, the rows of pixels 4*g* with which the sample S has been detected in the determination region 4A and the rows around the rows, and transfers, to the outside, the data of accumulated charges only for the pixels 4*g* in the detecting rows L1, with the result that the amount of data of accumulated charges to be transferred to the main control unit 7 can be reduced.

In other words, only the data of accumulated charges in the detecting rows L1 is used as information required to detect the foreign substance, and data of accumulated charges in other rows (non-detecting rows L2) that is not required as an inspection result is screened without being transferred, to thereby reduce the amount of data and enable real-time data transfer to the outside.

Further, the TDI computing unit 5 is configured to accumulate and transfer the charges for the pixels 4*g* in the next adjacent column only with the pixels 4*g* in the detecting rows L1 in the region 4B formed of the line sensors 4*l* in the columns subsequent to the determination region 4A, and not to accumulate and transfer charges for the pixels 4*g* in rows other than the detecting rows L1 in the region 4B formed of the line sensors 4*l* in the columns subsequent to the determination region 4A, with the result that the processing of accumulation and transfer of the charges in the TDI computing unit 5 can be reduced, and that a load on an arithmetic circuit and the like of the TDI computing unit 5 can be reduced.

Further, the TDI computing unit 5 is configured to suitably set the number of columns of the line sensors 4*l* in the determination region 4A depending on the material of the sample S. Therefore, through suitably setting a range of the determination region 4A depending on the base material of the sample S, for example, accuracy of detecting the foreign substance X in the determination region 4A can be increased as appropriate depending on the material of the sample S.

Note that, the technical scope of the present invention is not limited to the above-mentioned at least one embodiment, but various modifications may be made thereto without departing from the gist of the present invention.

For example, in the above-mentioned at least one embodiment, the plurality of columns of line sensors of all columns of the line sensors with which the sample is first detectable along with the movement of the sample are set in advance as the determination region. However, the TDI computing unit may set all columns of the TDI sensor as the determination region, accumulate charges in all columns of the TDI sensor, and determine whether the foreign substance is included based on data of accumulated charges obtained by accumulating and transferring the charges from the first column to the last column of the line sensors.

In this case, the data transfer unit transfers, to the external main control unit, only data of accumulated charges obtained by accumulating and transferring charges in detecting rows for the foreign substance detected with the use of all columns (determination region) of the line sensors.

What is claimed is:

1. An X-ray inspection apparatus, comprising:
an X-ray source configured to irradiate a sample with an X-ray;
a sample moving mechanism configured to move the sample in a particular direction during the irradiation with the X-ray from the X-ray source;
a TDI sensor, which is mounted on an opposite side of the X-ray source with respect to the sample, and includes a plurality of columns of line sensors in the particular direction, the line sensors each including a plurality of pixels arrayed in a direction orthogonal to the particular direction so that the pixels are arranged in matrix, the TDI sensor being configured to detect the X-ray that has been transmitted through the sample with the pixels; and
a TDI computing unit configured to control accumulation and transfer of charges in a plurality of the pixels in the particular direction,
the TDI computing unit including a data transfer unit configured to transfer, to an outside, data of accumulated charges obtained by accumulating and transferring the charges, and having a function of setting in advance, as a determination region, a plurality of columns of the line sensors with which the sample is detectable, and of detecting the sample in the determination region,
the data transfer unit being configured to set, as detecting rows, rows of the pixels with which the sample has been detected in the determination region and rows around the rows, and transfer, to the outside, the data of accumulated charges only for pixels in the detecting rows.

2. The X-ray inspection apparatus according to claim 1, wherein the TDI computing unit is configured to set in advance, as the determination region, a plurality of columns of the line sensors of all columns of the line sensors with which the sample is detectable first along with the movement of the sample, and to accumulate and transfer the charges only with pixels in the detecting rows in a region formed of the line sensors in columns subsequent to the determination region.

3. The X-ray inspection apparatus according to claim 1 or 2, wherein the TDI computing unit is configured to suitably set a number of columns of the line sensors in the determination region depending on a material of the sample.

4. An X-ray inspection method, comprising:
an X-ray irradiation step of irradiating, by an X-ray source, a sample with an X-ray;
a sample moving step of continuously moving the sample in a particular direction during the irradiation with the X-ray from the X-ray source;
an X-ray detection step of detecting, by a TDI sensor, which is mounted on an opposite side of the X-ray source with respect to the sample, and includes a plurality of columns of line sensors in the particular direction, the line sensors each including a plurality of pixels arrayed in a direction orthogonal to the particular direction so that the pixels are arranged in matrix, the X-ray that has been transmitted through the sample with the pixels;
a TDI computing step of accumulating and transferring charges in a plurality of the pixels in the particular direction; and a data transfer step of transferring, to an outside, data of accumulated charges obtained by accumulating and transferring the charges in the TDI computing step, the TDI computing step including setting in advance, as a determination region, a plurality of columns of the line sensors with which the sample is detectable, and determining to detect the sample in the determination region, the data transfer step including setting, as detecting rows, rows of the pixels with which the sample has been detected in the determination region and rows around the rows, and transferring, to the outside, the data of accumulated charges only for pixels in the detecting rows.

5. The X-ray inspection method according to claim 4, wherein the TDI computing step includes setting in advance, as the determination region, a plurality of columns of the line sensors of all columns of the line sensors with which the sample is detectable first along with the movement of the sample, and accumulating and transferring the charges for pixels in a next adjacent column only with pixels in the detecting rows in a region formed of the line sensors in columns subsequent to the determination region.

* * * * *